United States Patent
Denis

(10) Patent No.: US 10,828,713 B2
(45) Date of Patent: Nov. 10, 2020

(54) SYSTEMS AND METHODS FOR ADAPTIVELY CONTROLLING PHYSICAL LAYERS FOR WELD CABLE COMMUNICATIONS

(71) Applicant: ILLINOIS TOOL WORKS INC., Glenview, IL (US)

(72) Inventor: Marc Lee Denis, Lena, WI (US)

(73) Assignee: Illinois Tool Works Inc., Glenview, IL (US)

( * ) Notice: Subject to any disclaimer, the term of this patent is extended or adjusted under 35 U.S.C. 154(b) by 592 days.

(21) Appl. No.: 14/575,752

(22) Filed: Dec. 18, 2014

(65) Prior Publication Data
US 2016/0175962 A1    Jun. 23, 2016

(51) Int. Cl.
| | |
|---|---|
| *B23K 9/095* | (2006.01) |
| *B23K 9/10* | (2006.01) |
| *B23K 9/12* | (2006.01) |
| *H04B 3/06* | (2006.01) |
| *H04B 3/54* | (2006.01) |

(52) U.S. Cl.
CPC ............ *B23K 9/095* (2013.01); *B23K 9/1006* (2013.01); *B23K 9/1087* (2013.01); *B23K 9/124* (2013.01); *H04B 3/06* (2013.01); *H04B 3/544* (2013.01)

(58) Field of Classification Search
CPC .... B23K 9/095; B23K 9/1006; B23K 9/1087; B23K 9/124; H04B 3/06; H04B 3/544
USPC ......................................................... 219/130
See application file for complete search history.

(56) References Cited

U.S. PATENT DOCUMENTS

| | | | |
|---|---|---|---|
| 2,043,331 A | 6/1936 | Notvest | |
| 2,175,891 A | 10/1939 | Graham | |
| 2,526,597 A | 10/1950 | Winslow | |
| 2,617,913 A | 11/1952 | Oestreicher | |
| 2,642,515 A | 6/1953 | Bagg | |
| 3,496,328 A | 2/1970 | Moerke | |

(Continued)

FOREIGN PATENT DOCUMENTS

| | | |
|---|---|---|
| CN | 101516561 | 8/2009 |
| EP | 0575082 | 12/1993 |

(Continued)

OTHER PUBLICATIONS

Thomas Neu, Impact of Sampling-Clock Spurs on ADC Performance, 2009, Texas Instruments Incorporated.*

(Continued)

*Primary Examiner* — Tu B Hoang
*Assistant Examiner* — Vy T Nguyen
(74) *Attorney, Agent, or Firm* — McAndrews, Held & Malloy, Ltd.

(57) ABSTRACT

A welding system includes a welding power supply that provides a welding power for a welding application through the weld cable. Additionally, the welding system includes weld cable communications circuitry. The weld cable communications circuitry includes a receiver to receive data from the weld cable and to monitor the weld cable for frequency spurs or interfering signals, and to monitor network capacity. Additionally, and the weld cable communications circuitry includes a transmitter to transmit the data across the weld cable. Furthermore, the transmitter transmits the data via a physical layer transmission scheme selected based on the frequency spurs or interfering signals and the network capacity.

18 Claims, 7 Drawing Sheets

(56) References Cited

U.S. PATENT DOCUMENTS

| | | | | |
|---|---|---|---|---|
| 3,992,565 | A | 11/1976 | Gatfield | |
| 4,051,344 | A | 9/1977 | Robbins | |
| 4,079,231 | A | 3/1978 | Toth | |
| 4,147,919 | A | 4/1979 | Matasovic | |
| 4,216,367 | A | 8/1980 | Risberg | |
| 4,216,368 | A | 8/1980 | Delay | |
| 4,227,066 | A | 10/1980 | Bulwidas | |
| 4,247,752 | A | 1/1981 | Stringer | |
| 4,266,114 | A | 5/1981 | Hansen | |
| 4,410,789 | A | 10/1983 | Story | |
| 4,450,340 | A | 5/1984 | Corrigall | |
| 4,467,174 | A | 8/1984 | Gilliland | |
| 4,508,954 | A | 4/1985 | Kroll | |
| 4,521,672 | A | 6/1985 | Fronius | |
| 4,531,045 | A | 7/1985 | Kemp | |
| 4,561,059 | A | 12/1985 | Davis | |
| 4,584,685 | A | 4/1986 | Gajjar | |
| 4,608,482 | A | 8/1986 | Cox | |
| 4,641,292 | A | 2/1987 | Tunnell | |
| 4,767,908 | A | 8/1988 | Dallavalle | |
| 4,769,754 | A | 9/1988 | Reynolds | |
| 4,918,517 | A | 4/1990 | Burgoon | |
| 4,973,821 | A | 11/1990 | Martin | |
| 5,039,835 | A | 8/1991 | Schwiete | |
| 5,043,557 | A | 8/1991 | Tabata | |
| 5,063,282 | A | 11/1991 | Gilliland | |
| 5,276,305 | A | 1/1994 | Hsien | |
| 5,376,894 | A | 12/1994 | Petranovich | |
| 5,406,050 | A | 4/1995 | MacOmber | |
| 5,653,902 | A | 8/1997 | Chang | |
| 5,834,916 | A | 11/1998 | Shimogama | |
| 5,982,253 | A | 11/1999 | Perrin | |
| 6,040,555 | A | 3/2000 | Tiller | |
| 6,091,048 | A | 7/2000 | Lanouette | |
| 6,103,994 | A | 8/2000 | Decoster | |
| 6,156,999 | A | 12/2000 | Ignatchenko | |
| 6,166,506 | A | 12/2000 | Pratt | |
| 6,225,596 | B1 | 5/2001 | Chandler | |
| 6,423,936 | B1 | 7/2002 | Reed | |
| 6,458,157 | B1 | 10/2002 | Suaning | |
| 6,479,791 | B1 | 11/2002 | Kowaleski | |
| 6,479,795 | B1 | 11/2002 | Albrecht | |
| 6,570,132 | B1 | 5/2003 | Brunner | |
| 6,624,388 | B1 * | 9/2003 | Blankenship | B23K 9/1062 219/130.5 |
| 6,627,849 | B2 | 9/2003 | Ihde | |
| 6,636,776 | B1 * | 10/2003 | Barton | B23K 9/1062 219/109 |
| 6,653,597 | B2 | 11/2003 | Baum | |
| 6,710,927 | B2 | 3/2004 | Richards | |
| 6,781,095 | B2 | 8/2004 | Hayes | |
| 6,818,860 | B1 | 11/2004 | Stava | |
| 6,906,285 | B2 | 6/2005 | Zucker | |
| 6,909,285 | B2 | 6/2005 | Jordan | |
| 7,205,503 | B2 | 4/2007 | Reynolds | |
| 8,345,819 | B2 | 1/2013 | Mastronardi | |
| 9,352,411 | B2 | 5/2016 | Batzler | |
| 9,511,443 | B2 | 12/2016 | Pfeifer | |
| 2001/0043656 | A1 | 11/2001 | Koslar | |
| 2003/0089693 | A1 | 5/2003 | Hayes | |
| 2004/0199846 | A1 | 10/2004 | Matsumoto | |
| 2005/0087523 | A1 | 4/2005 | Zucker | |
| 2005/0230372 | A1 * | 10/2005 | Ott | B23K 9/1087 219/132 |
| 2006/0027546 | A1 | 2/2006 | Reynolds | |
| 2006/0076335 | A1 | 4/2006 | Reynolds | |
| 2006/0086706 | A1 | 4/2006 | Ulrich | |
| 2006/0138113 | A1 | 6/2006 | Ott | |
| 2007/0056942 | A1 | 3/2007 | Daniel | |
| 2007/0080154 | A1 * | 4/2007 | Ott | B23K 9/095 219/132 |
| 2007/0114216 | A1 | 5/2007 | Ott | |
| 2007/0267395 | A1 | 11/2007 | Broadwater | |
| 2011/0069766 | A1 | 3/2011 | Takahashi | |
| 2011/0073569 | A1 | 3/2011 | Rappl | |
| 2011/0134976 | A1 | 6/2011 | Fossion | |
| 2011/0240620 | A1 * | 10/2011 | Ott | B23K 9/1087 219/130.5 |
| 2011/0248009 | A1 * | 10/2011 | Long | G05G 1/305 219/132 |
| 2012/0037354 | A1 | 2/2012 | McCoy | |
| 2012/0076212 | A1 | 3/2012 | Zeppetelle | |
| 2012/0097644 | A1 | 4/2012 | Ott | |
| 2012/0099864 | A1 * | 4/2012 | Ishihara | H04B 3/06 398/65 |
| 2012/0128042 | A1 | 5/2012 | Tzou | |
| 2012/0207057 | A1 * | 8/2012 | Karaoguz | G01S 5/0252 370/254 |
| 2013/0288211 | A1 | 10/2013 | Patterson | |
| 2014/0001169 | A1 | 1/2014 | Enyedy | |
| 2014/0076872 | A1 | 3/2014 | Ott | |
| 2014/0263256 | A1 | 9/2014 | Rappl | |
| 2014/0269873 | A1 * | 9/2014 | Tahir | H04W 52/241 375/227 |
| 2014/0269874 | A1 | 9/2014 | Afkhami | |
| 2015/0196970 | A1 | 7/2015 | Denis | |
| 2015/0258621 | A1 | 9/2015 | Ulrich | |
| 2015/0375330 | A1 * | 12/2015 | Doi | B23K 9/1006 219/132 |

FOREIGN PATENT DOCUMENTS

| | | |
|---|---|---|
| EP | 1586403 | 10/2005 |
| EP | 1748573 | 1/2007 |
| EP | 2020758 | 2/2009 |
| JP | S59193768 | 11/1984 |
| JP | 61137675 | 6/1986 |
| JP | 162966 | 6/1992 |
| JP | 04162964 | 6/1992 |
| JP | 4162964 | 6/1992 |
| JP | 04162966 | 6/1992 |
| JP | 05104248 | 2/1993 |
| JP | H1133729 | 2/1999 |
| JP | 2003088957 | 3/2003 |
| JP | 2003154455 | 5/2003 |
| JP | 2003191075 | 7/2003 |
| JP | 2003236663 | 8/2003 |
| WO | 2009149425 | 12/2009 |
| WO | 2010051104 | 5/2010 |
| WO | 2011041037 | 4/2011 |
| WO | 2012058164 | 5/2012 |

OTHER PUBLICATIONS

Echelon, "PL 3120 / PL 3150 Power Line Smart Transceiver Data Book," Version 2, 005-0154-01C.

Hackl et al., "Digitally Controlled GMA Power Sources," Fronius, www.fronius.com/worldwide/usa/products/paper_digitally_controlld_power_sources_gb.pdf, pp. 1-7, publication date not provided.

Intellon, "CEBus Power Line Encoding and Signaling," White Paper #0027, Mar. 1997, Version 0.1, pp. 1-6.

International Search Report from PCT application No. PCT/US2015/060762, dated Mar. 11, 2016, 13 pgs.

Canadian Office Action Appln No. 2,970,281 dated Mar. 5, 2019, 5 pgs.

Communication Appln No. 15 804 258.0 issued by the European Patent Office dated Nov. 28, 2018, 5 pgs.

Canadian Office Action Appln No. 2,970,281 dated Feb. 25, 2020, 4 pgs.

* cited by examiner

SYSTEMS AND METHODS FOR ADAPTIVELY CONTROLLING PHYSICAL LAYERS FOR WELD CABLE COMMUNICATIONS

BACKGROUND

The present disclosure relates generally to welding systems, and more particularly to systems and methods for weld cable communications.

Welding is a process that has become increasingly prevalent in various industries and applications. Such processes may be automated in certain contexts, although a large number of applications continue to exist for manual welding applications. In both cases, such welding applications rely on a variety of types of equipment to ensure that the supply of welding consumables (e.g., wire and shielding gas) is provided to the weld in an appropriate amount at the desired time. For example, metal inert gas (MIG) welding typically relies on a wire feeder to enable a welding wire to reach a welding torch. The wire is continuously fed during welding to provide filler metal. A welding power source ensures that arc heating is available to melt the filler metal and the underlying base metal. Data communications between system components are utilized to control such supply of consumables. It is now recognized that it is desirable to provide more robust systems and techniques for data communication in a welding system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below In one embodiment, a welding system includes a welding power supply that provides a welding power for a welding application through the weld cable. Additionally, the welding system includes weld cable communications circuitry. The weld cable communications circuitry includes a receiver to receive data from the weld cable and to monitor the weld cable for frequency spurs or interfering signals, and to monitor network capacity. Additionally, and the weld cable communications circuitry includes a transmitter to transmit the data across the weld cable. Furthermore, the transmitter transmits the data via a physical layer transmission scheme selected based on the frequency spurs or interfering signals and the network capacity.

In another embodiment, a method includes monitoring a weld cable for frequency spurs or interfering signals and network capacity with a receiver of weld cable communications circuitry. Further, the method includes transmitting a tone through the weld cable from a transmitter disposed along the weld cable with a welding system. The welding system is provides a welding power and data communication for a welding process via the weld cable. Furthermore, the method includes changing a physical layer transmission scheme of the transmitter based on the frequency spurs or the interfering signals and the network capacity.

In another embodiment, a welding system includes a wire feeder that receives a welding power for a welding application through the weld cable. Additionally, the wire feeder includes weld cable communications circuitry. The weld cable communications circuitry includes a receiver to receive data from the weld cable and to monitor the weld cable for frequency spurs or interfering signals, and to monitor network capacity. Additionally, and the weld cable communications circuitry includes a transmitter to transmit the data across the weld cable. Furthermore, the transmitter transmits the data via a physical layer transmission scheme selected based on the frequency spurs or interfering signals and the network capacity.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
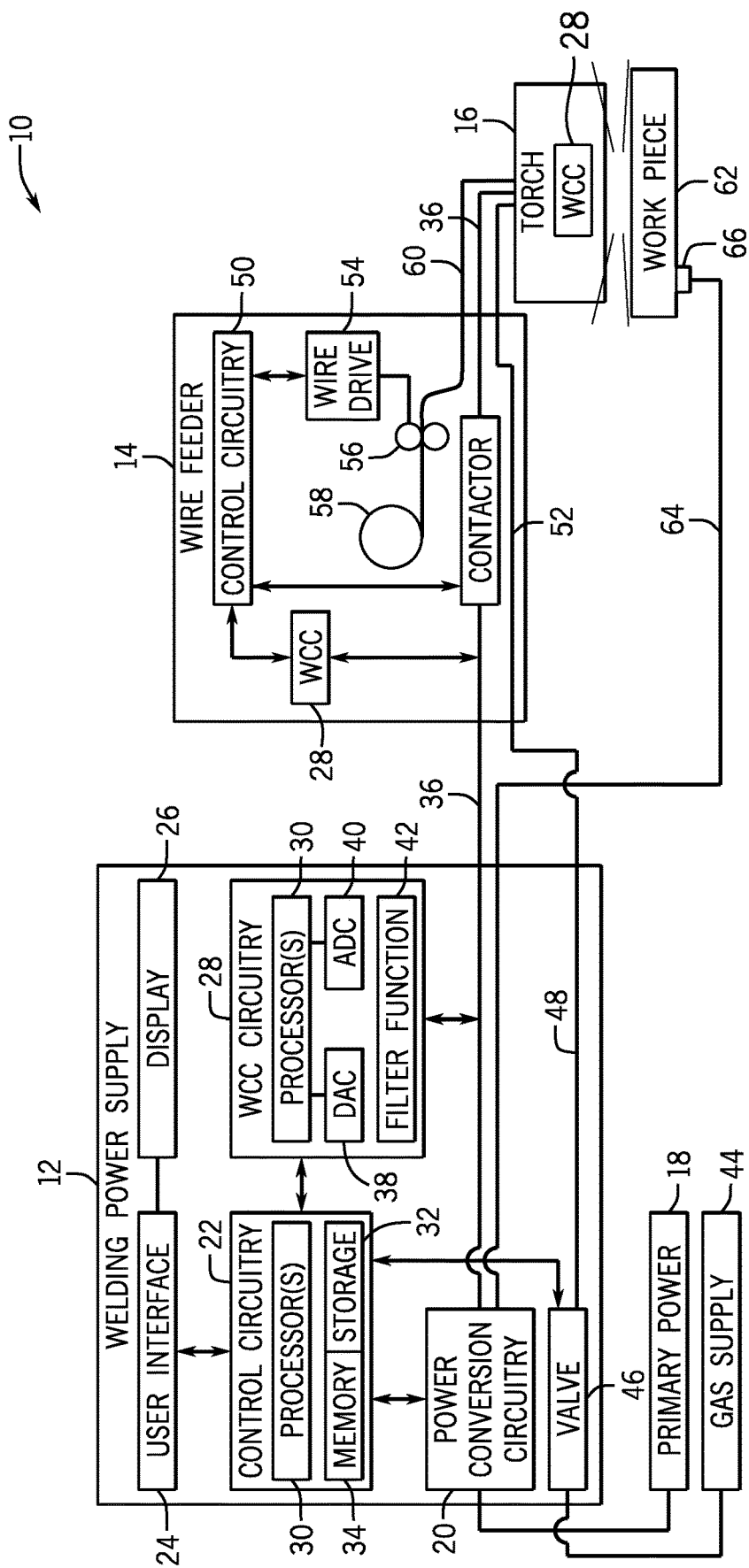
FIG. 1 is a block diagram of an embodiment of a welding system with a welding power supply having weld cable communications (WCC) circuitry, in accordance with aspects of the present disclosure.

Turning now to the drawings, FIG. 1 is a block diagram of an embodiment of a welding system 10 having a welding power supply 12, a wire feeder 14, and a welding torch 16. The welding system 10 powers, controls, and supplies consumables to a welding application. In certain embodiments, the welding power source 12 directly supplies input power to the welding torch 16. The welding torch 16 may be a torch configured for stick welding, tungsten inert gas (TIG) welding, or gas metal arc welding (GMAW), based on the desired welding application. In the illustrated embodiment, the welding power source 12 is configured to supply power to the wire feeder 14, and the wire feeder 14 may be configured to route the input power to the welding torch 16. In addition to supplying an input power, the wire feeder 14 may supply a filler metal to a welding torch 14 for various welding applications (e.g., GMAW welding, flux core arc welding (FCAW)).

The welding power supply 12 receives primary power 18 (e.g., from the AC power grid, an engine/generator set, a battery, or other energy generating or storage devices, or a combination thereof), conditions the primary power, and provides an output power to one or more welding devices in accordance with demands of the system 10. The primary power 18 may be supplied from an offsite location (e.g., the primary power may originate from the power grid). Accordingly, the welding power supply 12 includes power conversion circuitry 20 that may include circuit elements such as transformers, rectifiers, switches, and so forth, capable of converting the AC input power to AC or DC output power as dictated by the demands of the system 10 (e.g., particular welding processes and regimes).

In some embodiments, the power conversion circuitry 20 may be configured to convert the primary power 18 to both weld and auxiliary power outputs. However, in other embodiments, the power conversion circuitry 20 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 22 to control the operation of the welding power supply 12. The welding power supply 12 also includes a user interface 24. The control circuitry 22 may receive input from the user interface 24 through which a user may choose a process and input desired parameters (e.g., voltages, currents, particular pulsed or non-pulsed welding regimes, and so forth). The user interface 24 may receive inputs using any input device, such as via a keypad, keyboard, buttons, touch screen, voice activation system, wireless device, etc. Furthermore, the control circuitry 22 may control operating parameters based on input by the user as well as based on other current operating parameters. Specifically, the user interface 24 may include a display 26 for presenting, showing, or indicating, information to an operator. The control circuitry 22 may also include interface circuitry for communicating data to other devices in the system 10, such as the wire feeder 14. For example, in some situations, the welding power supply 12 may wirelessly communicate with other welding devices within the welding system 10. Further, in some situations, the welding power supply 12 may communicate with other welding devices using a wired connection, such as by using a network interface controller (NIC) to communicate data via a network (e.g., ETHERNET, 10baseT, 10base100, etc.). In particular, the control circuitry 22 may communicate and interact with weld cable communications (WCC) circuitry 28, as further described in detail below.

The control circuitry 22 includes at least one controller or processor 30 that controls the operations of the welding power supply 12, and may be configured to receive and process multiple inputs regarding the performance and demands of the system 10. Furthermore, the processor 30 may include one or more microprocessors, such as one or more "general-purpose" microprocessors, one or more special-purpose microprocessors and/or Application Specific Integrated Circuits (ASICS), or some combination thereof. For example, in certain embodiments, the processor 30 may include one or more digital signal processors (DSPs).

The control circuitry 22 may include a storage device 32 and a memory device 34. The storage device 32 (e.g., nonvolatile storage) may include ROM, flash memory, a hard drive, or any other suitable optical, magnetic, or solid-state storage medium, or a combination thereof. The storage device 32 may store data (e.g., data corresponding to a welding application), instructions (e.g., software or firmware to perform welding processes), and any other suitable data. As may be appreciated, data that corresponds to a welding application may include an attitude (e.g., orientation) of a welding torch, a distance between the contact tip and a workpiece, a voltage, a current, welding device settings, and so forth.

The memory device 34 may include a volatile memory, such as random access memory (RAM), and/or a nonvolatile memory, such as read-only memory (ROM). The memory device 34 may store a variety of information and may be used for various purposes. For example, the memory device 34 may store processor-executable instructions (e.g., firmware or software) for the processor 30 to execute. In addition, a variety of control regimes for various welding processes, along with associated settings and parameters, may be stored in the storage device 32 and/or memory device 34, along with code configured to provide a specific output (e.g., initiate wire feed, enable gas flow, capture welding current data, detect short circuit parameters, determine amount of spatter) during operation.

In certain embodiments, the welding power flows from the power conversion circuitry 20 through a weld cable 36 to the wire feeder 14 and the welding torch 16. Furthermore, in certain embodiments, welding data may be provided with the weld cable 36 such that welding power and weld data are provided and transmitted together over the weld cable system. In particular, the WCC circuitry 28 may be communicatively coupled to the weld cable 36 to communicate (e.g., send/receive) data over the weld cable 36. The WCC circuitry 28 may be implemented based on various types of power line communications methods and techniques. For example, the WCC circuitry 28 may utilize IEEE standard P1901.2 to provide data communications over the weld cable 36. In this manner, the weld cable 36 may be utilized to provide welding power from the welding power supply 12 to the wire feeder 14 and the welding torch 16. Furthermore, the weld cable 36 may also be utilized to transmit (and/or receive) data communications to the wire feeder 14 and the welding torch 16.

In certain embodiments, the WCC circuitry 28 includes one or more processors 30, a digital to analog convertor 38 (e.g. DAC 38, which may function as a transmitter), an analog to digital converter 40 (e.g., ADC 40, which may function as a receiver), and a filter function 42 (e.g., filter circuitry, digital filter function circuitry, filter function software executable by the one or more processors 30, or any combination thereof). In particular, the WCC circuitry 28 may be utilized to determine channel equalization filter coefficients representative of a distortive characteristic and/ or a distortion related to a weld cable. Specifically, the distortive characteristic may be a frequency and time dependent amplitude and phase distortion (e.g., amplitude and/or phase distortion that is both frequency dependent and time dependent), as further described with respect to FIGS. 2-3. Further, the WCC circuitry 28 may be configured to utilize the channel equalization filter coefficients to compensate for the distortive characteristic of the weld cable. In certain embodiments, the WCC circuitry 28 may include one or more processors 30 separate from the processors 30 of the control circuitry 22. In certain embodiments, the WCC circuitry 28 may utilize the processors 30 of the control circuitry 22. In certain embodiments, the WCC circuitry 28 may be incorporated within, or may be coupled to, the control circuitry 22.

The DAC 38 may be coupled to the processor 30, and is configured to transmit data communications utilizing one or more carrier channels or "tones." Specifically, the one or more tones may be described as complex sinusoidal signals that are transmitted by the DAC 38. In certain embodiments, the DAC 38 may be disposed within the welding power supply 12, and the tones may be transmitted to one or more components of the welding system 10, such as to the welding torch 16 and/or the wire feeder 14. In other embodiments, the DAC 38 may be disposed within the welding torch 16, and the tones may be transmitted to the welding power supply 12 and/or the wire feeder 14. Likewise, in other embodiments, one or more components of the WCC circuitry 28 (e.g., the DAC 38, the ADC 40, or the filter function 42) may be disposed anywhere within the welding system 10, such as within the wire feeder 14 and/or the welding torch 16.

In certain embodiments, the DAC 38 may transmit modulated tones and/or unmodulated tones. Modulated tones may be utilized to communicate (e.g., send/receive) data using one or more known techniques for modulating a signal for data transmission. For example, the DAC 38 may utilize a hybrid amplitude and phase modulation scheme, such as Bi-Phase Shift Keying (BPSK), Quadrature Phase Shift Keying (QPSK), 16-ary Quadrature Amplitude Shift Keying (16-QAM) or similar variations. The modulated tones transmitted may include any type of information useful for the welding process or operation. For example, in some situations, the data transmitted by the WCC circuitry 28 may include information related to any welding parameter (e.g., weld voltage, wire speed) that is transmitted to the wire feeder 14 and/or the welding torch 16 for welding applications.

In some embodiments, the DAC 38 may also transmit unmodulated tones (also known as "pilot tones") that do not carry data. Specifically, unmodulated tones may be sinusoidal signals that have predefined or known characteristics, such as a predefined amplitude, frequency and phase. For example, for a given process, the DAC 38 may transmit unmodulated tones having the same amplitude but a different frequency, which may be an integral multiple of a lower reference frequency and a phase offset value. In particular, in certain embodiments, modulated tones may be distinguishable from unmodulated tones based on their assigned frequency, or their position within an OFDM frame. For example, the positional assignment of modulated versus unmodulated tones may be pre-assigned and this position may be known at the receiver (e.g., the ADC 40). Since the characteristics of the unmodulated tones are also known, unmodulated tones may be utilized as reference tones. In certain embodiments, a set of modulated tones with known characteristics may also be transmitted. For example, modulated tones with a known data modulation scheme, and a known (or pre-defined) data sequence may be transmitted in lieu of and/or along with the known unmodulated tones.

Accordingly, the data sequence may be of the form of cyclic prefix within the OFDM frame, for example, such that the last N symbols of an OFDM frame are appended to the beginning of the frame. At the receiver (e.g., the ADC 40), a circular convolution of the received frame may be performed and the results of that convolution may be used to compute the equivalent frequency and time dependent amplitude and phase distortion in the weld cable 36, and from that information a set of coefficients for a correcting channel equalization filter (e.g., an inverse function of the measured distortion) may be determined. Accordingly, in certain embodiments, either a known modulated or a known unmodulated tone may be utilized as a reference. In certain embodiments, the DAC 38 may transmit a plurality of tones, any number of which may be modulated or unmodulated. For example, out of 64 tones transmitted by the DAC 38, 48 of the tones may be modulated tones utilized for data transmission and 16 tones may be unmodulated tones utilized as reference tones (without any data modulation). It should be noted that the DAC 38 may be configured to transmit any number of modulated tones and unmodulated tones.

In certain embodiments, an Orthogonal Frequency Division Multiplexing (OFDM) scheme may be utilized by the DAC 38 to transmit the modulated and unmodulated tones on multiple carrier frequencies (e.g., frequency-division multiplexing). For example, within the OFDM scheme, the DAC 38 may be configured to transmit the one or more tones over several parallel data stream or channels at a low modulation rate, thereby maintaining transmission characteristics that are similar to a single-carrier modulation scheme. In particular, the frequency-division multiplexing scheme may divide a single transmission medium having a particular total bandwidth into a series of non-overlapping frequency sub-bands that are each configured to carry a particular signal. In this manner, the single transmission medium (e.g., the weld cable 36) may be shared by multiple separate unmodulated or modulated tones.

Figure 2:
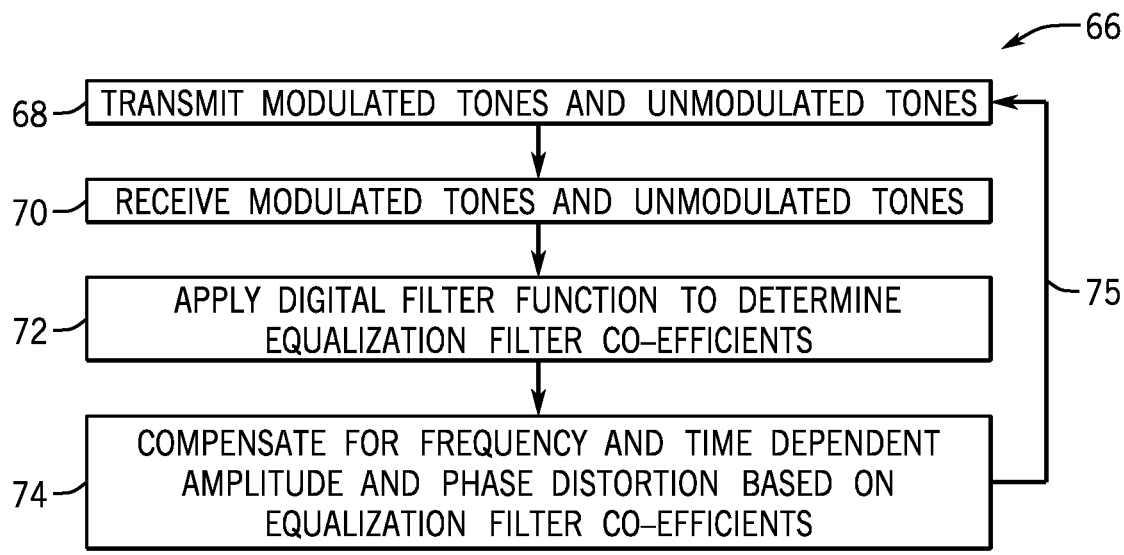
FIG. 2 is a flow diagram of an embodiment of a method for compensating for frequency and time dependent amplitude and phase distortions utilizing channel equalization filter coefficients, in accordance with aspects of the present disclosure.
Figure 3:
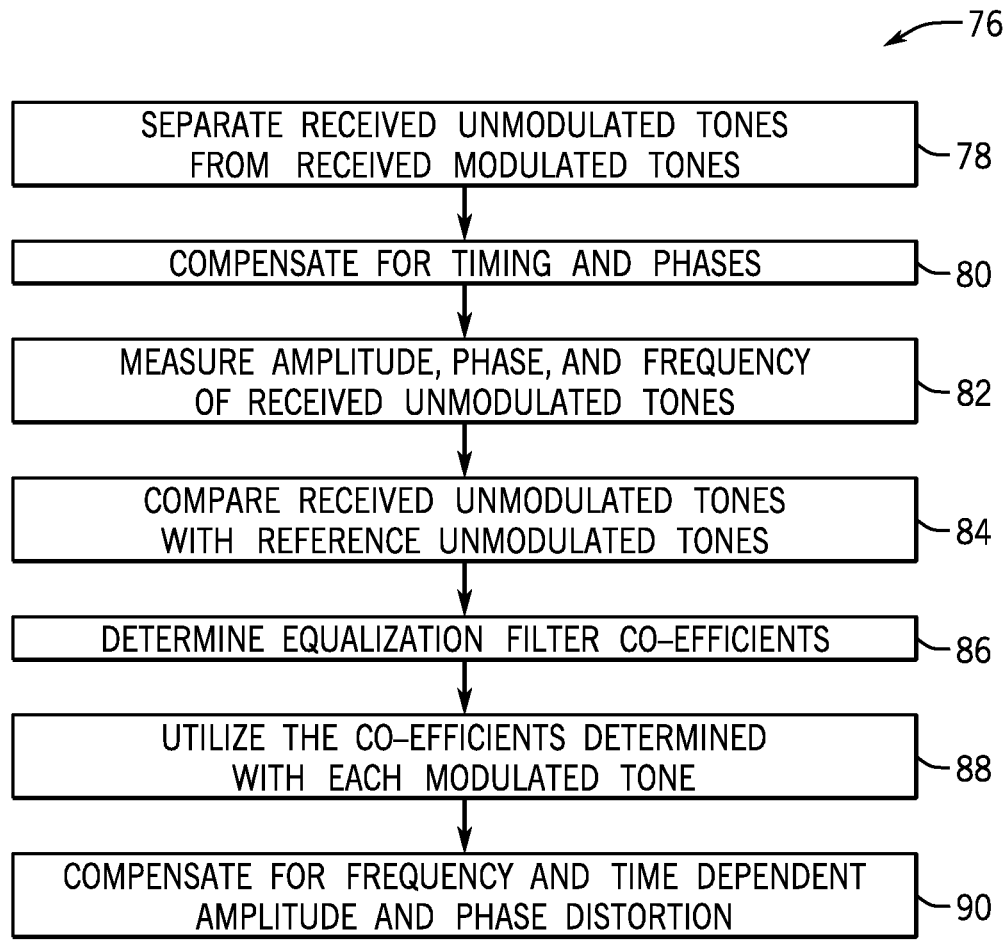
FIG. 3 is a flow diagram of an embodiment of a method for calculating the channel equalization filter coefficients of FIG. 2, in accordance with aspects of the present disclosure.

In certain embodiments, the ADC 40 of the WCC circuitry 28 may be configured to receive the several transmitted modulated and unmodulated tones, as described with respect to FIGS. 2-3. Further, the filter function 42 may be configured to process and analyze the received modulated and unmodulated tones to characterize the weld cable 36. More specifically, the filter function 42 of the WCC circuitry 28 may be configured to apply a digital filter function that is configured to compare the unmodulated tones transmitted by the DAC 38 with the unmodulated tones received by the ADC 40. In particular, based on the differences (if any) between the transmitted unmodulated signals and received unmodulated signals, the filter function 42 may be configured to determine one or more coefficients (e.g., values, polynomials, etc.). In certain embodiments, the one or more coefficients may correspond to distortion characteristics of the weld cable 36. Furthermore, the filter function 42 may be configured to utilize the determined coefficients to compensate for possible frequency and time dependent amplitude and phase distortion in the weld cable 36, as further described with respect to FIGS. 2-3. In certain embodiments, the WCC circuitry 28 is configured to communicate with the control circuitry 22, which may be configured to adjust a welding voltage provided to the welding torch 16 (and/or to the wire feeder 14) based on information received from the filter function 42.

Further, in certain embodiments, the storage device 32 or the memory device 34 may be configured to store data related to the WCC circuitry 28, such as characteristics (e.g., a phase, an amplitude, a frequency) of each unmodulated tone transmitted or received by the WCC circuitry 28, information related to the frequency of each tone transmitted or received by the WCC circuitry 28, the number and/or grouping of the unmodulated or modulated tones, the one or more determined frequency and time dependent amplitude and phase distortions in the weld cable 36, the location of the DAC 38 and/or the ADC 40, the channel equalization filter coefficients calculated or determined by the WCC circuitry 28, a current, previous, actual, or corrected welding operating parameter (e.g., welding voltage, wire speed), and any other information related to the WCC circuitry 28. In addition, in certain embodiments, the storage device 32 or the memory device 34 may be configured to store one or more templates of unmodulated (e.g., reference) or modulated tones that have known characteristics. For example, the one or more templates may include 16 unmodulated tones each having a known amplitude, a known frequency, and a known phase shift. When one or more unmodulated tones are received by the WCC circuitry 28, the WCC circuitry 28 may be configured to compare the received modulated or unmodulated tones with a corresponding template.

A gas supply 44 provides shielding gases, such as argon, helium, carbon dioxide, and so forth, depending upon the welding application. The shielding gas flows to a valve 46, which controls the flow of gas, and if desired, may be selected to allow for modulating or regulating the amount of gas supplied to a welding application. The valve 46 may be opened, closed, or otherwise operated by the control circuitry 22 to enable, inhibit, or control gas flow (e.g., shielding gas) through the valve 46. Shielding gas exits the valve 46 and flows through a cable 48 (which in some implementations may be packaged with the welding power output) to the wire feeder 14 which provides the shielding gas to the welding application. As may be appreciated, certain embodiments of the welding system 10 may not include the gas supply 44, the valve 46, and/or the cable 48.

In certain embodiments, the wire feeder 14 may use the welding power to power the various components in the wire feeder 14, such as to power control circuitry 50. As noted above, the weld cable 36 may be configured to provide or supply the welding power. The welding power supply 12 may also communicate with the wire feeder 14 using the cable 36 and the WCC circuitry 28 disposed within the welding power supply 12. In certain embodiments, the wire feeder 14 may include the WCC circuitry 28, which is substantially similar to the WCC circuitry 28 of the welding power supply 12. Indeed, the WCC circuitry 28 of the wire feeder 14 may cooperate with the control circuitry 50 of the wire feeder 14 in similar ways as the welding power supply 12 cooperates with the control circuitry 22. The control circuitry 50 controls the operations of the wire feeder 14. In certain embodiments, the wire feeder 14 may use the control circuitry 50 to detect whether the wire feeder 14 is in communication with the welding power supply 12 and to detect a current welding process of the welding power supply 12 if the wire feeder 14 is in communication with the welding power supply 12. Additionally, the control circuitry 50 may also detect communication data originating from the welding power supply. For example, the weld cable 36 may provide a communication medium for the communication data to reach the wire feeder 14, and the control circuitry 50 may receive and convert the communication data into a useable form at the wire feeder 14 (e.g., audio and/or visual communication).

Further, while the DAC 38 is illustrated within both the welding power supply 12 and the torch 16, it may be appreciated that the transmitters 38 may be located anywhere along the weld cable 36. Furthermore, the receivers 40 may similarly be located anywhere along the weld cable 36. For example, the receivers 40 may be located within the welding power supply 12, the wire feeder 14, and/or the torch 16 to receive data from the transmitters located in other areas of the weld cable 36. In this embodiment, the transmitters 38 and the receivers 40 enable two-way communication. That is, the transmitters 40 are capable of transmitting data at multiple locations along the weld cable 36, and the receivers 40 are also capable of receiving the data at multiple locations along the weld cable 36.

A contactor 52 (e.g., high amperage relay) is controlled by the control circuitry 50 and configured to enable or inhibit welding power to continue to flow to the weld cable 36 for the welding application. In certain embodiments, the contactor 52 may be an electromechanical device, while in other embodiments the contactor 52 may be any other suitable device, such as a solid state device. The wire feeder 14 includes a wire drive 54 that receives control signals from the control circuit 50 to drive rollers 56 that rotate to pull wire off a spool 58 of wire. The wire is provided to the welding application through a wire cable 60. Likewise, the wire feeder 14 may provide the shielding gas through the cable 48. As may be appreciated, in certain embodiments, the cables 36, 48, and 60 may be bundled together or individually provided to the welding torch 16.

The welding torch 16 delivers the wire, welding power, and shielding gas for a welding application. The welding torch 16 is used to establish a welding arc between the welding torch 16 and a workpiece 62. In certain embodiments, the weld torch 16 may include the WCC circuitry 28, which is substantially similar to the WCC circuitry 28 of the welding power supply 12. Indeed, the WCC circuitry 28 of the weld torch 16 may interact in similar ways as the welding power supply 12 cooperates with the control circuitry 22. A work cable 64, which may be terminated with a clamp 66 (or another power connecting device), couples the welding power supply 12 to the workpiece 62 to complete a welding power circuit.

FIG. 2 is a flow diagram of an embodiment of a method 66 for correcting a distortive characteristic of the weld cable 36 in the weld system 10, in accordance with aspects of the present disclosure. Specifically, the distortive characteristic may be a frequency and time dependent amplitude and phase distortion of the weld cable 36. The distortive characteristic may be determined by determining one or more channel equalization filter coefficients. Further, the WCC circuitry 28 may compensate for the distortive characteristic by utilizing the determined channel equalization filter coefficients.

As noted above with respect to FIG. 1, the WCC circuitry 28 of the welding power supply 12 may be configured to characterize the parameters or properties of the weld cable 36 with one or more channel equalization filter coefficients.

Specifically, the one or more channel equalization filter coefficients may be values that are representative of various characteristics of the weld cable 36. For example, the channel equalization filter coefficients may be representative of a distortive characteristic of the weld cable 36. In other words, the channel equalization filter coefficients may be representative of frequency and time dependent amplitude and phase distortions of the weld cable 36. In this manner, the systems and methods described herein allow for the characterization of the weld cable 36, and obviate the need for taking actual measurements to characterize the weld cable 36, as further described in detail below. Further, the one or more channel equalization filter coefficients may be utilized to compensate for frequency and time dependent amplitude and phase distortion within the weld cable 36 that may influence the power or data being transmitted. For example, certain embodiments address situations in which the welding voltage provided by the welding power supply 12 would be substantially different than the welding voltage received by the welding torch 16 due to frequency and time dependent amplitude and phase distortion in the weld cable 36 if not mitigated. Accordingly, the WCC circuitry 28 may be configured to determine one or more channel equalization filter coefficients that may be representative of distortion characteristics of the weld cable 36. Further, the WCC circuitry 28 may be configured to utilize the one or more channel equalization filter coefficients that are determined to compensate for any frequency and time dependent amplitude and phase distortion within the weld cable 36, as further described below.

The method 66 begins with the WCC circuitry 28 transmitting modulated tones and unmodulated tones (block 68) from the welding power supply 12 and/or the wire feeder 14. Specifically, the DAC 38 of the WCC circuitry 28 (of either the welding power supply 12 or the wire feeder 14) may be configured to transmit the modulated and unmodulated tones. As noted above, modulated tones may include information related to the welding process or operation, such as information related to an operating parameter (e.g., weld voltage, wire speed, etc.) of the welding system 10 or related to an adjusted operating parameter of the welding system 10. In particular, unmodulated tones (e.g., pilot tones) transmitted by the DAC 38 may not carry any information related to the welding process or operation. Instead, unmodulated tones may be sinusoidal reference signals that have predefined or known characteristics, such as a predefined amplitude, frequency, and/or phase. For example, in certain embodiments, all of the unmodulated tones transmitted may have the same frequency and amplitude. In certain embodiments, the modulated tones transmitted may also have known characteristics that allow the modulated tones to be utilized as the reference tones. Furthermore, in certain embodiments, the unmodulated tones may each be transmitted at a known phase. For example, each of the unmodulated tones transmitted may be equally spaced in tone frequency, such that each succeeding tone increments its phase reference to the first tone by 90 degrees. For example, if a first unmodulated tone is at a reference of 0 degrees of phase, a second unmodulated tone may be at 90 degrees phase, a third unmodulated tone may be at 180 degrees phase, and so forth. It should be noted that the unmodulated tones may be configured at any alternate unmodulated tone configuration, so long as the frequency, amplitude and phase configurations are known and substantially constant. For example, in certain embodiments, the phase of each unmodulated tone need not be equally spaced, so long as the phase is known.

The method 66 further includes the WCC circuitry 28 receiving the transmitted modulated and unmodulated tones at the ADC 40 (block 70). In certain embodiments, the WCC circuitry 28 may transmit the modulated tones and unmodulated tones to the welding torch 16 and may receive the transmitted tones from the welding torch 16. In such situations, the WCC circuitry 28 may be configured to account or compensate for the distortion of the weld cable 36 twice and/or in two directions (e.g., a first distortion from the WCC circuitry 28 to the welding torch 16 and a second distortion from the welding torch 16 to the WCC circuitry 28). In other embodiments, the welding torch 16 may include a DAC 38 that is configured to transmit the modulated and unmodulated tones. In such situations, the WCC circuitry 28 may be configured to account or compensate or the distortion of the weld cable 36 once and/or in one direction. In either situation, the ADC 40 may be configured to receive the modulated and unmodulated tones, and may also be configured to receive the original location from which the tones were transmitted.

The ADC 40 may provide the received tones (e.g., modulated and unmodulated) to the filter function 42 for further processing. Further, in certain embodiments, the method 66 includes applying a digital filter function to the received modulated and unmodulated tones with the filter function 42 (block 72). As noted above, the digital filter function may be utilized to compare the transmitted unmodulated tones with the received unmodulated tones. As noted above, the transmitted unmodulated tones are transmitted with a known amplitude, frequency, and phase. Accordingly, in certain embodiments, the transmitted unmodulated tones may be utilized as reference tones and compared with the received unmodulated tones within the filter function 42 to determine one or more differences, such as differences in phase, amplitude, or frequency. Based on the differences between the transmitted and received unmodulated tones, the filter function 42 may be configured to determine one or more channel equalization filter coefficients. Specifically, the channel equalization filter coefficients may be representative of the distortive characteristics of the weld cable 36, as further described with respect to FIG. 3.

Further, the method 66 includes compensating for the frequency and time dependent amplitude and phase distortion (e.g., distortive characteristic of the weld cable 36) utilizing the channel equalization filter coefficients (block 74). In certain embodiments, the WCC circuitry 28 may be configured to adjust one or more welding parameters based on the one or more determined coefficients and based on the characteristics of the weld cable 36. For example, in certain situations, the WCC circuitry 28 may increase or decrease a welding voltage provided by the welding power supply 12 to the wire feeder 14 and/or the welding torch 16 based on the calculated channel equalization filter coefficients. As a further example, the WCC circuitry 28 may be configured to increase or decrease a wire speed provided by the wire feeder 14 based on the calculated channel equalization filter coefficients. In some embodiments, the WCC circuitry 28 provides this information to the control circuitry 22, so that the control circuitry 22 may make the proper adjustments to the welding parameters and/or provide the information to other components of the welding system 10. In short, the WCC circuitry 28 may be configured to provide to the welding system 10 the determined and/or calculated distortive characteristics and/or coefficients of the weld cable 36. Accordingly, the calculated or determined distortive characteristics and/or coefficients may be provided by the control circuitry 22 as actual feedback to other components of the welding system 10.

In particular, the method 66 may be utilized as a continuous feedback loop 75 that allows for the correction of power and data transmitted via the weld cable 36 in subsequent times based on the information calculated and determined. In this manner, the WCC circuitry 28 may be configured to regulate and correct for any frequency and time dependent amplitude and phase distortion in the weld cable 36 in a dynamic process during the operation of the welding torch 16. Accordingly, more accurate welding operating parameters may be utilized during the welding process. For example, with the continuous feedback loop 75, the WCC circuitry 28 may dynamically adjust the welding voltage provided to the welding torch 16 and workpiece 62 during the welding process.

FIG. 3 is a flow diagram of an embodiment of a method 76 for calculating the one or more channel equalization filter coefficients of FIG. 2, in accordance with aspects of the present disclosure. As noted above, the filter function 42 of the WCC circuitry 28 may be configured to apply a digital filter function to the modulated and unmodulated tones received by the ADC 40 and transmitted by the DAC 38. In particular, the filter function 42 may be configured to calculate or determine one or more channel equalization filter coefficients based on the modulated and unmodulated tones received by the ADC 40, as further described below.

In certain embodiments, the method 76 begins with separating the unmodulated tones from the modulated tones received by the ADC 40 (block 78). For example, in certain embodiments, the ADC 40 may receive 64 tones, of which 48 tones are modulated tones utilized for data transmission and 16 tones are unmodulated tones. Accordingly, the unmodulated tones may be separated from the modulated tones by the filter function 42 for further processing to determine the one or more coefficients.

In certain embodiments, the method further includes compensating for timing and phasing of the unmodulated tones (block 80). For example, in some situations, there may be one or more clocking variations between the DAC 38 and the ADC 40. Accordingly, the filter function 42 may be configured to compensate for the frequency error between the DAC 38 and the ADC 40 with one or more frequency and/or phase control loops. In particular, the ADC 40 may be configured to associate each transmitted tone with a corresponding received tone. For example, 16 unmodulated tones may be transmitted by the DAC 38 with a known amplitude, a known frequency, and at a known phase shift. Accordingly, each of the 16 transmitted unmodulated tones may correspond to each of the 16 received unmodulated tones. In certain embodiments, compensating for frequency and phase may include associating the transmitted tone with its corresponding received tone. In certain embodiments, the method 76 may be configured to compensate and correct for the frequency variations between the DAC 38 and the ADC 40 before separating the modulated tones from the unmodulated tones.

Furthermore, the method 76 may include measuring the characteristics (e.g., phase, amplitude and/or frequency) of the received unmodulated tones. Accordingly, in certain embodiments, the filter function 42 may be configured to measure the actual amplitude, and the actual phase of the received unmodulated tones (block 82). As noted above, the transmitted unmodulated tones may be transmitted with a known frequency, a known amplitude, and a known phase and may thus be utilized as a reference tone. Accordingly, once the actual characteristics of the received unmodulated tones are determined, the method 76 may include comparing the characteristics of the received unmodulated tones with the characteristics of the transmitted (reference) unmodulated tones (block 84). Comparing the received unmodulated tones and the transmitted (reference) unmodulated tones may be done in any suitable manner.

For example, in certain embodiments, the received unmodulated tones are multiplied by the complex conjugate of the original transmitted (reference) unmodulated tones. The expected result of a vector multiplied by its complex conjugate is a vector with an amplitude and no imaginary part. In this case, the expected answer would be "1+j0." The error vector resulting from the multiplication of the complex conjugate of the received unmodulated tones and the original transmitted (reference) tones is utilized to perform an interpolation. The interpolation populates missing members of the set of tones, at each indexed frequency, with a phasor with an interpolated amplitude and an interpolated phase. In certain embodiments, however, the actual result of a vector multiplied by its complex conjugate indicates an amplitude and phase distortion for each tone. For example, the actual answer will be a series of vectors, each with amplitude and phase, for each pilot tone frequency. Accordingly, if 16 unmodulated tones are received for an OFDM Symbol Length of 64, the actual result of the digital filter function process may be a 3×64 matrix with frequency, amplitude, and phase as column vectors and each of the 64 values assuming a row position. The 16 measured error vectors populate the positions in the 3×64 matrix assigned to the reference tones and the 48 'missing' tones, assigned to the data tones, are populated with interpolated values. The resulting 3×64 matrix is then used as the data to calculate the channel equalization filter and also the inverse of the channel equalization filter. Other reference tone versus data tone cofigurations, FFT lengths, and OFDM symbol configurations are possible.

The filter function 42 may be configured to utilize the differences determined between the received unmodulated tones and the transmitted (reference) unmodulated tones to determine the channel equalization filter coefficients (block 86). As noted above, the channel equalization filter coefficients define a Finite Impulse Response (FIR) or Infinite Impulse Response (IIR) filter with a length that is determined by the number of tones used in the OFDM system, otherwise specified as the symbols in an OFDM frame, excluding any cyclic prefix, and which filter provides an inverse function to the frequency dependent amplitude and phase distortion of the weld cable 36. As further information, the inverse of the channel equalization filter is the analytic description of the two port transfer function of the weld cable as a transmission line. For example, the inverse of the channel equalization filter coefficients may be transformed, using a mathematical algorithm, to describe any characteristic or physical property of the weld cable 36 that may have an effect on the power or data transmitted by the weld cable 36. The transfer function (inverse channel equalization filter) may be representative of a length of the weld cable 36, a resistance, an inductance, and so forth. However, it should be noted that the inverse channel equalization filter (transfer function) is not the characteristic itself, but are merely an abstract representation of the characteristics as defined in a sampled time reference system.

In certain embodiments, the method 76 further includes utilizing the channel equalization filter coefficients determined from the unmodulated tones pre-distort each of the modulated and unmodulated tones that will be transmitted by the DAC 38 in the next iteration of the function (block 88). For example, the unmodulated tones may be multiplied with the modulated tones by the channel equalization (FIR) filter to correct for the frequency and time dependent amplitude and phase distortion of the weld cable 36 (e.g., distortive characteristic of the weld cable 36). Accordingly, in this manner, it may be beneficial to utilize the channel equalization filter coefficients to compensate for frequency and time dependent amplitude and phase distortion in the weld cable system (block 90).

In certain embodiments, the method 76 calculates the channel equalization filter and its inverse function. The inverse function of the channel equalization filter provides the equivalent two port transfer function of the weld cable and can be used as an element in the feedback loop within the welding power supply 12 control system, effectively replacing the voltage sense cable 92.

Figure 4:
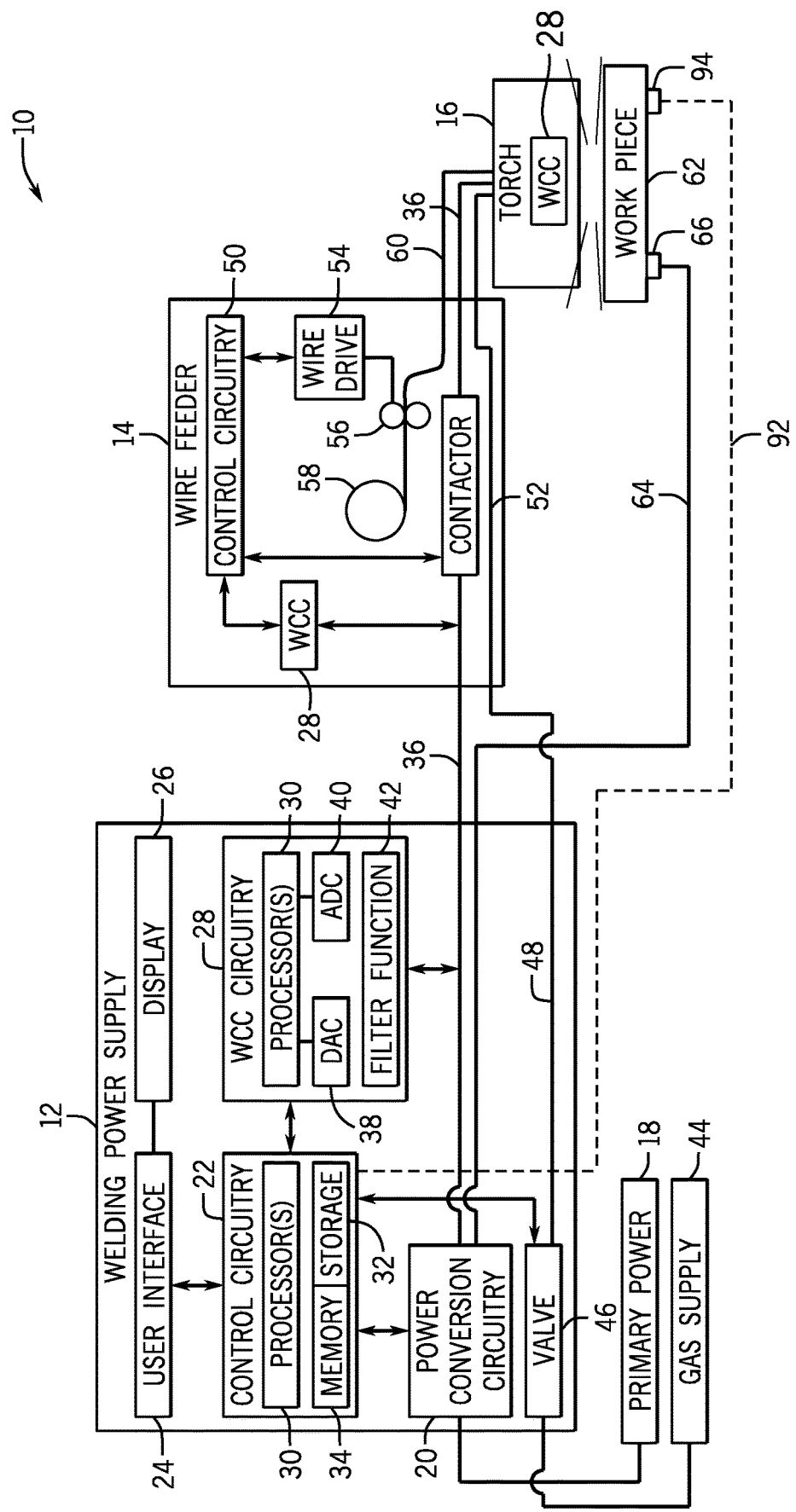
FIG. 4 is a block diagram of an embodiment of the welding system of FIG. 1, illustrating the welding power supply having the WCC circuitry and a voltage sense cable, in accordance with aspects of the present disclosure.

FIG. 4 is a block diagram of an embodiment of the welding system 10 of FIG. 1, illustrating the welding power supply 12 having the WCC circuitry 28 and a voltage sense cable 92, in accordance with aspects of the present disclosure. In certain embodiments, a voltage sense cable 92 is coupled from the control circuitry 22 of the welding power supply 12 to the workpiece 62 using a sense clamp 94 (or another power connecting mechanism). In other embodiments, the voltage sense cable 92 may also be coupled to the wire feeder 14.

In certain embodiments, the voltage sense cable 92 may be configured to determine the actual welding voltage between the welding torch 16 and the workpiece 62. Specifically, the voltage sense cable 92 may be configured to provide the actual welding voltage to the control circuitry 22 of the welding power supply 12 during operation of the welding system 10. In certain embodiments, the information received from the WCC circuitry 28 regarding compensating and/or correcting for the frequency and time dependent amplitude and phase distortion in the weld cable 36 may be compared to the actual weld voltage measurements provided by the voltage sense cable 92. Accordingly, the control circuitry 22 may monitor the accuracy of the digital filter function and the accuracy of the frequency and time dependent amplitude and phase distortion in the weld cable 36 based on the comparison of the actual welding voltage with the estimated and compensated frequency and time dependent amplitude and phase distortion in the weld cable 36.

Figure 5:
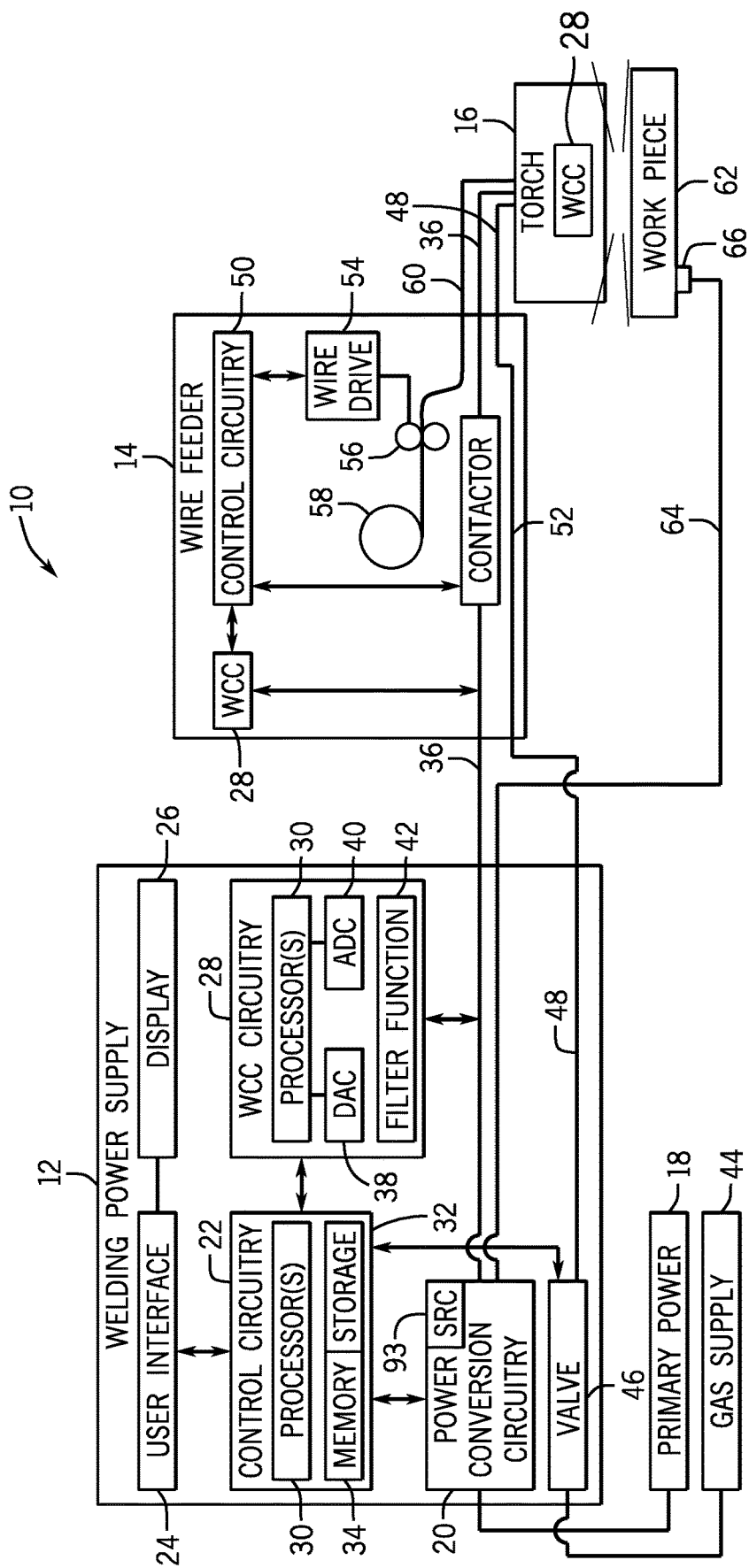
FIG. 5 is a block diagram of an embodiment of the welding system of FIG. 1, illustrating switching regulator circuitry of the power conversion circuitry, in accordance with aspects of the present disclosure.

FIG. 5 is a block diagram of an embodiment of the welding system 10 of FIG. 1, illustrating switching regulator circuitry 93 of the power conversion circuitry 20, in accordance with aspects of the present disclosure. In the welding power supply 12, the switching regulator circuitry 93 provides automated control of voltage and current used during the welding application. For example, during the welding application, the voltage and the current may change several times based on welding time, temperature, and production lot. The switching regulator circuitry 93 may induce frequency spurs within the welding power supply 12 that are transmitted across the weld cable 36 during the welding applications. The frequency spurs or other interfering signals, as discussed in more detail below, may provide interference with data transmission across the weld cable 36. Accordingly, the DAC 38 is instructed by the processor 30 to transmit data at frequency ranges that limit interference by the frequency spurs or the other interfering signals not otherwise related to the welding power supply 12.

To track the frequency spurs on the weld cable, the WCC circuitry 28 includes the ADC 40 coupled to the weld cable 36. The ADC 40 may monitor power and data characteristics along the weld cable 36 and provide information received while monitoring the weld cable 36 to the processor 30. For example, the ADC 40 may measure voltage across the weld cable 36, current flowing through the weld cable 36, and/or a frequency along the weld cable 36. The processor 30 processes the information from the ADC 40 and determines presence and magnitude of the frequency spurs within the weld cable 36. Additionally, the control circuitry 22 of the welding power supply 12 may also monitor the switching regulator circuitry 93 directly. For example, the processor 30 provides instructions to the switching regulator circuitry 93 to switch the voltage or current of the welding power supply 12 increasing a potential for the presence of the frequency spurs. Accordingly, the processor may control the frequency range of the data transmitted by the DAC 38 in such a manner to avoid the frequency spurs when the processor 30 determines that there is a likelihood of the frequency spurs occurring based on the instructions provided to the switching regulator circuitry 93.

Additionally, the WCC circuitry 28 of the wire feeder 14 may include similar components as the WCC circuitry 28 of the welding power supply 12. For example, when a communication device (e.g., a microphone in a welding helmet or the torch 16) is coupled to the wire feeder 14, the ADC 40 within the WCC circuitry 28 monitors the weld cable 36, and the processor 30 within the control circuitry 50 determines what frequency the DAC 38 within the WCC circuitry 28 transmits the data from the communication device. In this manner, two-way communication between the welding power supply 12 and the wire feeder 14 is available to limit interference from the frequency spurs or other interfering signals.

Figure 6:
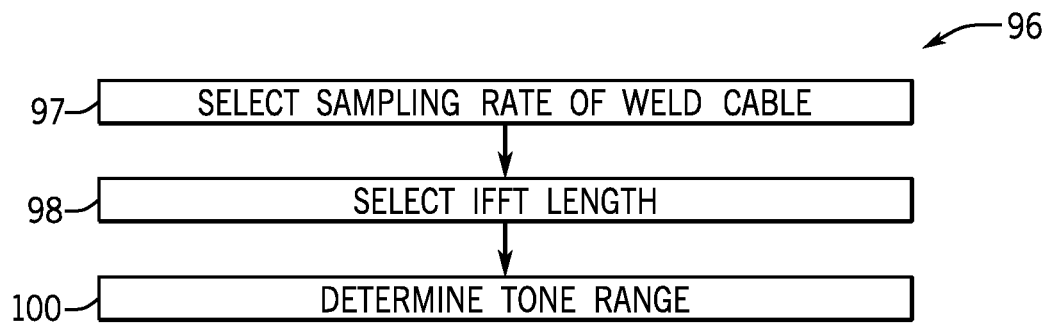
FIG. 6 is a flow diagram of a method for determining a tone range of data transmission, in accordance with aspects of the present disclosure.

FIG. 6 is a flow diagram of an embodiment of a method 96 for determining a frequency range for the data transmission across the weld cable 36, in accordance with aspects of the present disclosure. Once data transmission is accomplished via the DAC 38 of the WCC circuitry 28, it may become desirable to transmit the data at different frequencies based on changing operational parameters of the welding system 10. For example, as welding voltage or current levels provided by the welding power supply 12 switch under control of switching regulator circuitry 93, the frequency spurs may develop in the weld cable 36 harmonically related to a switching frequency of the power supply 12. The frequency spurs may be a narrow band interferer of the data transmitted across the weld cable 36 when employing a frequency domain transmission scheme. Accordingly, it may be advantageous to dynamically alter data transmission frequency within the frequency range established by the method 96 to limit interference by the frequency spurs resulting from power supply switching, which regulates the weld voltage and current for the welding system 10.

Initially, a sampling rate of the weld cable 36 by the WCC circuitry 28 is selected by the processor 30 of the control circuitry 22 based on instructions received from the memory 34 (block 97). The weld cable 36 may be sampled at a sampling rate which is nominally above a Nyquist rate for a highest frequency tone of interest. For example, if the upper frequency of a data transmission scheme is 500 kHz, then the Nyquist rate is 1000 kHz, and a 1200 kHz sampling rate may be selected.

In one embodiment, an Orthogonal Frequency Division Multiplex (OFDM) scheme is used by the DAC 38 for the data transmission across the weld cable 36. In this embodiment, data transmission tones are generated by the DAC 38 using an Inverse Fast Fourier Transform (IFFT) of a given length that is an integer power of 2. Once the sampling rate is selected, a length of the IFFT may also be selected by the processor 30 (block 98). The length of the IFFT may determine the data rate. For example, the length is a number of data points used in the IFFT calculation. Accordingly, the greater the length of the IFFT, the greater a frequency resolution of the data transmission becomes. However, the greater frequency resolution may come at the cost of increased operations to achieve the frequency resolution, resulting in a decrease in a data transmission rate via the DAC 38. On the other hand, a decrease in the length of the IFFT may increase the data transmission rate, but the result is a loss in clarity of the data transmission.

After selecting the length of the IFFT, the processor 30 determines a tone range (block 100). For example, if an IFFT length of 256 is selected, the length and sampling rate provide a $0^{th}$ tone carrier at 1200 kHz/256, or 4.6875 kHz. Therefore, the OFDM tones may be selected between 4.6875 kHz and 500 kHz (i.e., a highest used data signaling frequency). However, the OFDM tones close to 4.6875 kHz may be within low frequency noise of the welding system 10. Accordingly, a $31^{st}$ tone carrier of 145.3125 kHz (i.e., 4.6875 kHz×31) may be selected by the processor 30 as a lower range of the frequency spectrum (i.e., a lowest used data signaling frequency) for the data transmission to occur above the low frequency noise of the welding system 10.

While the description above related to FIG. 5 discusses determining the frequency range for an OFDM scheme using the processor 30. It may be appreciated that similar methods may be used for other data transmission schemes. For example, it is contemplated that a similar method may be used for a direct-sequence spread spectrum (DSSS) scheme, a frequency-hopping spread spectrum (FHSS) scheme, a custom scheme, or any other data transmission scheme available for communication across the weld cable 36. Further, such schemes may be implemented via the DAC 38.

Further, because the spacing of the carrier tones (i.e., the length of the IFFT) affects the data rate, different signaling may be used by the DAC 38 to influence the data rate. For example, with quadrature phase-shifting key (QPSK) signaling, 4 different states are used by the DAC 38 to indicate an individual state when transmitting the data across the weld cable 36. Accordingly, the number of bits per state is $\log_2 4=2$ bits per state. Therefore, 2 bits of data are assigned in an individual signal that is transmitted across the weld cable 36, as described above. Alternatively, using quadrature amplitude modulation (QAM) 64 signaling, 64 different states are used to indicate an individual state. Accordingly, the number of bits per state is $\log_2 64=6$ bits per state. Therefore, 6 bits of data are assigned to an individual signal that is transmitted across the weld cable 36. Therefore, utilizing the QAM 64 signaling in place of the QPSK signaling, the DAC 38 transmits data via the weld cable 36 3-times faster for the same channel bandwidth. Thus, selecting different signal modulation techniques may also influence the data transmission rate.

Figure 7:
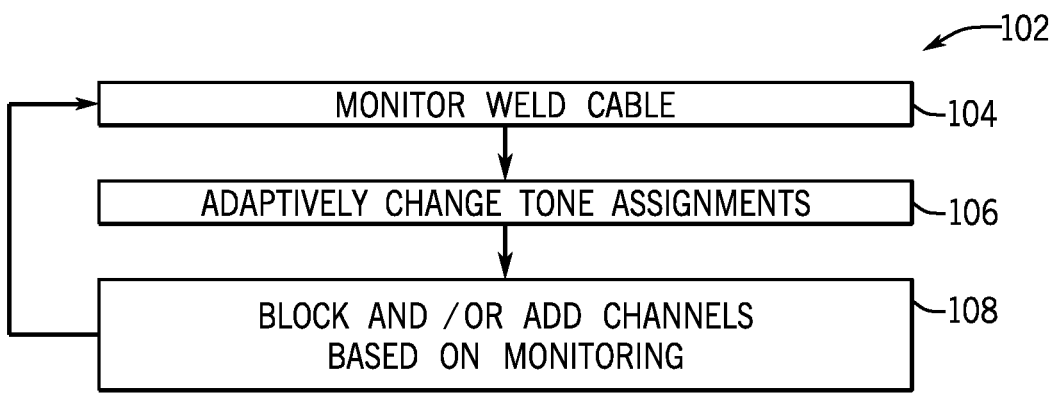
FIG. 7 is a flow diagram of a method for adaptively changing tone assignments for the data transmission, in accordance with aspects of the present disclosure.

FIG. 7 is a flow diagram of an embodiment of a method 102 for adaptively changing tone assignments for the data transmission, in accordance with aspects of the present disclosure. The welding power supply 12 may operate with the switching regulator circuitry 93 to control voltage and currents used in the welding system 10. The switching regulator circuitry 93 may exhibit frequency spurs, which are harmonically related to a switching frequency of the welding power supply 12. The frequency spurs may provide a narrow band interferer for digital data communications using a frequency domain method (e.g., OFDM, DSSS, and FHSSS). Because of the interference, the method 102 may provide a method for the data transmission to avoid interference from the frequency spurs or other interfering signals.

Initially, the ADC 40 of the WCC circuitry 28 constantly monitors the weld cable 36 for voltage and current switching at the power supply 12 and/or other noise within a frequency band that may interfere with the data transmission across the weld cable 36 (block 104). As mentioned above, the frequency spurs resulting from the switching circuitry of the power supply 12 may interfere with some frequency ranges of the data transmission across the weld cable 36. Therefore, the ADC 40 monitors the weld cable 36 for the frequency spurs or other forms of interference. Additionally, in some embodiments, the processor 30 of the control circuitry 22 may monitor the switching regulator circuitry 93. When the processor 30 provides instructions for the switching regulator circuitry 93 to switch the voltage or current supply across the weld cable 36, the processor 30 may determine a likelihood of potential frequency spurs as a result of switching the voltage or current supply.

Upon detecting the frequency spurs, the processor 30 may instruct the DAC 38 to adaptively change tone assignments to limit interference from the frequency spurs with the data transmission across the weld cable 36 (block 106). As the ADC 40 monitors the weld cable 36, any frequency spurs, or events that may result in frequency spurs, are observed (e.g., voltage or current switching at the power supply 12). Once the ADC 40 makes such an observation, the DAC 38 may be instructed by the processor 30 to adjust the tone assignments for the data transmission. For example, when a frequency spur is observed by the ADC 40, the DAC 38 may change the tone assignments to a higher frequency, which is out of a range of the frequency spur. Similarly, when the processor 30 observes an event in the switching regulator circuitry 93 that may result in a frequency spur, the DAC 38 may also change the tone assignments to a higher frequency, which is out of a predicted range of the potential frequency spur.

In addition to adaptively changing the tone assignments, the processor 30 instructs the DAC 38 to block and/or add frequency channels based on monitoring data from the ADC 40 and the processor 30 (block 108). For example, if an abundance of frequency spurs are observed or predicted in a certain frequency range, the processor 30 may block the DAC 38 from assigning tones in the certain frequency range for future data transmissions. Additionally, after the ADC 40 observes minimal frequency spurs in a range that was previously blocked, the processor 30 may open the previously blocked range for future tone assignments by the DAC 38 based on a reduced likelihood of frequency spurs interfering with the data transmission across the weld cable 36. Further, in another embodiment, the processor 30, upon the ADC 40 observing interference from frequency spurs, may alter the data transmission scheme of the DAC 38 to increase the upper frequency range. In this manner, the DAC 38 may add additional bandwidth to the data transmission scheme in an event where a lower range of the frequency is blocked at block 108.

While the processor 30 and DAC 38 adaptively change tone assignments (block 106) and block and/or add channels (block 108), the sensor 93 may continue to monitor the weld cable 36 (block 104). By continuously monitoring the weld cable 36, the processor 30 is capable of dynamically instructing the DAC 38 to alter tone assignments and block and/or add frequency ranges based on realized or potential interference of the data transmission. Therefore, the DAC 38 may enhance reliability of the data transmission by avoiding dropped or altered data transmissions resulting from frequency spur interference.

Additionally, the WCC circuitry 28 may utilize different forward error correction (FEC) schemes and settings, in a similar manner to changing the tone assignments, to minimize dropped or altered data transmissions. The FEC schemes enable the ADC 40 of the WCC circuitry 28 to detect whether data transmitted from the torch 16, for example, contains any errors, and also provides a mechanism to correct the errors in the data. The FEC scheme may be implemented as a streaming data approach (i.e., detecting errors as the data streams into the ADC 40) in place of the DAC 40 sending known unmodulated tones, as described above relating to FIGS. 2 and 3. Additionally, implementing other error mitigation schemes, such as interleaving schemes, may also be adaptively applied based on an environment of the welding system 10.

Figure 8:
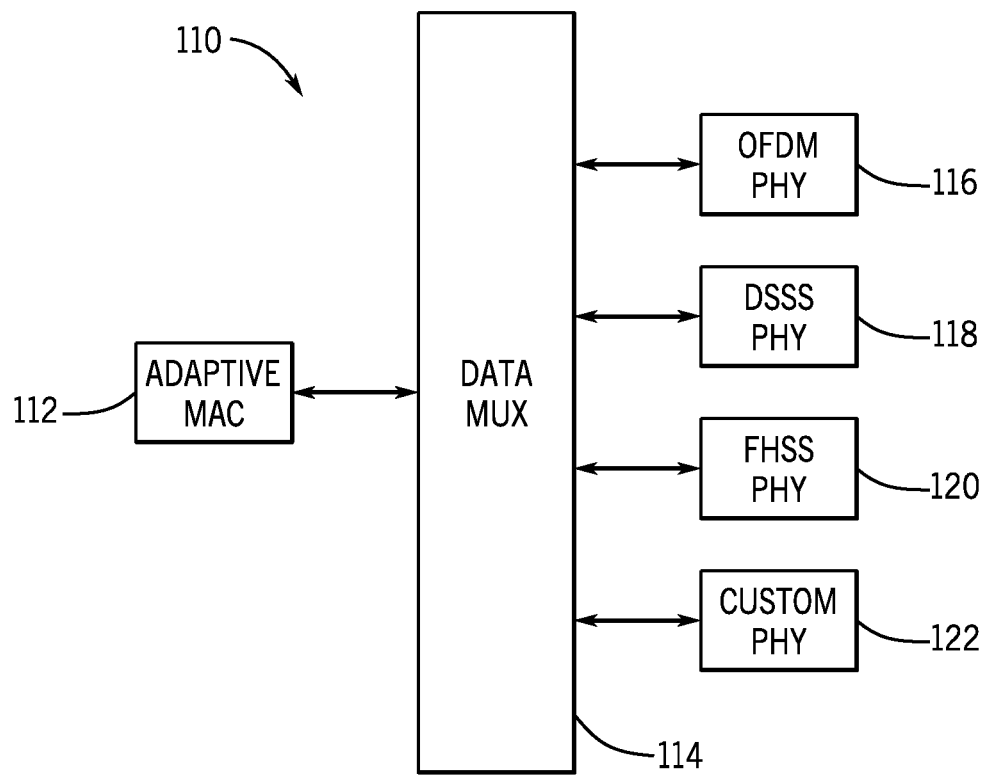
FIG. 8 is a block diagram of a physical layer communication system for the data transmission, in accordance with aspects of the present disclosure.

FIG. 8 is a block diagram of a physical layer communication system 110 for the data transmission across the weld cable 36, in accordance with aspects of the present disclosure. In addition to altering the tone assignment based on interferences and distortion in the weld cable 36, a physical layer transmission scheme of the tone may also be altered. As illustrated, the physical layer communication system 110 includes an adaptive media access controller (MAC) 112, a data multiplexer 114, and several distinct physical layer (PHY) channels 116, 118, 120, and 122. For example, the physical layer communication system 110 includes an Orthogonal Frequency Division Multiplex (OFDM) PHY 116, a Direct Sequence Spread Spectrum (DSSS) PHY 118, a Frequency Hopping Spread Spectrum (FHSS) PHY 120, and a custom PHY 122. The PHY channels 116, 118, 120, and 122 represent various digital communication transmission schemes for transmitting tones carrying the data, as discussed above. For example, the OFDM PHY 116 may be the root for IEEE 802.11, 4G LTE, IEEE P1901.2 (G3 Power Line Communication), or a custom OFDM. Likewise, the DSSS PHY 118 is a version of a digital communication implementation resembling Code Division Multiple Access (CDMA) standards, such as an IS-95 standard, and the FHSS PHY 120 is a version of a digital communication implementation resembling an IEEE 802.11.15 standard or an IEEE 802.16 WiMAX standard shifted down to a lower frequency range. Additionally the PHY channels 116, 118, 120, and 122 may be realized via digital signal processing (DSP) when the welding system 10 utilizes the processor 30. Alternatively, the PHY channels 116, 118, 120, and 122 may be realized with hardware through field programmable gate arrays (FPGAs) or through application-specific integrated circuits (ASICs). For example, each of the PHY channels 116, 118, 120, and 122 may be built within the WCC circuitry 28 using one or more FPGAs or ASICs to accomplish a specific digital communication transmission scheme.

Additionally, the custom PHY 122 is customizable to incorporate any digital communication method that may be customized for transmission of data via the tones across the weld cable 36. Customization of the custom PHY 122 may be accomplished wirelessly, through removable storage media, or through a wired data connection, for example. Further, it may be appreciated that while the OFDM PHY 116, the DSSS PHY 118, and the FHSS PHY 120 are similar PHYs used in wireless communication, the PHY channels 116, 118, and 120 are also tailored specifically for communication over the weld cable 36 and may lack features present in their wireless communication counterparts. For example, the PHY channels 116, 118, 120, and 122 take data for transmission across the weld cable 36, encrypt the data to their own digital communication scheme, and transmit and receive the encrypted data as the tones provided across the weld cable 36 via the transmitters 38 and the receivers 40. The digital communication methods stray from wireless transmission steps, as the encrypted data is transmitted across the weld cable 36. Additionally, the PHY channels 116, 118, 120, and 122 may also operate at frequencies below 30 MHz for long distance communications rather than frequencies greater than 500 MHz for cellular data communications.

Further, the data multiplexer 114 supplies the data from a selected PHY channel 116, 118, 120, or 122 to the DAC 38. In this manner, the selected PHY channel 116, 118, 120, or 122 may transform data into an analog form suitable for long range transmission. Once the selected PHY channel 116, 118, 120, or 122 transforms the data, the MAC 112 may receive the transformed data and operate as a link between the transformed data and the DAC 38 for transmission across the weld cable 36. Similarly, on a receiving end, the MAC 112 may reassemble the data from the modulated or unmodulated tones received by the ADC 40 and determine the appropriate PHY 116, 118, 120, or 122 for decoding. Further, the MAC 112 may also contribute to selecting from the PHY channels 116, 118, 120, or 122 the transmission scheme the system uses at any given time. For example, the MAC 112 may contribute to network capacity and latency analysis in determining an appropriate PHY channel 116, 118, 120, or 122.

In another embodiment, more than one PHY channel 116, 118, 120, or 122 may operate concurrently. For example, the OFDM PHY 116, the DSSS PHY 118, and the FHSS PHY 120 are configurable to be mutually orthogonal. That is, the PHY channels 116, 118, and 120 are configurable to exist in the same time-frequency space without interfering with one another. Accordingly, it may be beneficial for the physical layer communication system 110 to operate more than one of the PHY channels 116, 118, and 120 at the same time to offer levels of redundancy within the physical layer communication system 110.

By way of example, the welding system 10 may include a newer version of the welding power supply 12 communicating with an older version of the wire feeder 14 and a newer version of the torch 16. The newer version of the welding power supply 12 may concurrently transmit the data across the weld cable 36 using both the OFDM PHY 116 and the DSSS PHY 118 via the DAC 38 within the WCC circuitry 28. The older version of the wire feeder 14 may receive and process data transmitted by the DAC 38 using the OFDM PHY 116, while the newer version of the torch 16 may receive and process data transmitted by the DAC 38 using the DSSS PHY 118. Therefore, transmitting the data using two PHY channels 116 and 118 enables backward compatibility with older equipment, and provides redundancy to the physical layer communication system 110. Additionally, the ability to repurpose the custom PHY 122 also enables forward growth into future signaling schemes.

Figure 9:
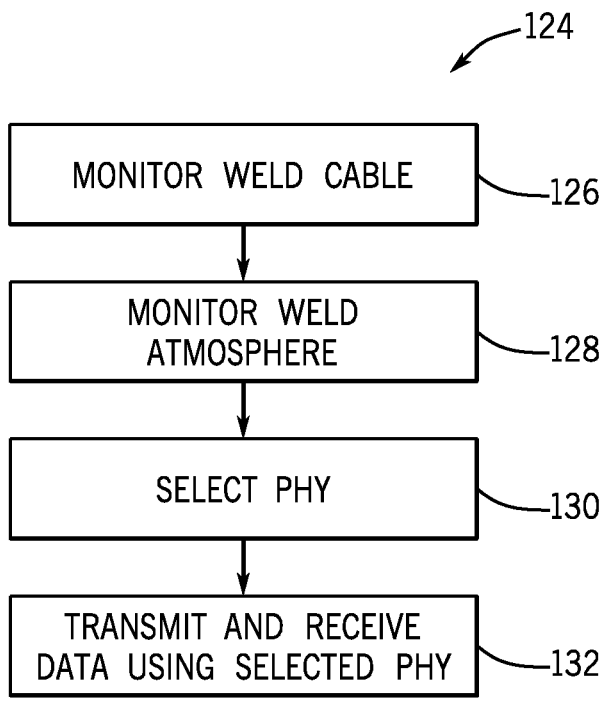
FIG. 9 is a flow diagram of a method for adaptively selecting a physical layer communication scheme for the data transmission, in accordance with aspects of the present disclosure.

FIG. 9 is a flow diagram of a method 124 for adaptively selecting a PHY channel 116, 118, 120, or 122 for the data transmission across the weld cable 36, in accordance with aspects of the present disclosure. Initially, the WCC circuitry 28 monitors the weld cable 36 (block 126). In monitoring the weld cable 36, the ADC 40 of the WCC circuitry 28 determines realized or predicted interference within the weld cable 36, as discussed above relating to FIG. 7. Once the interference is determined, the processor 30 may adjust, for example, frequency ranges of the data transmission by the DAC 38, or other data transmission characteristics, as discussed above relating to the methods 96 and 102.

While monitoring the weld cable 36, the ADC 40 may also monitor a weld atmosphere of the welding system 10 (block 128). The weld atmosphere may include a number of welders on a common weld return circuit, data transmission demand from the welders, latency costs associated with accessing a communications link, frequency spurs, interfering signals, or any other factor that may influence selection of a physical layer transmission scheme. For example, the ADC 40 may detect an indication from the DAC 38 that the latency costs of the data being transmitted is high, and a new PHY channel 116, 118, 120, or 122 may be selected by the welding system 10 to meet a latency cost demand. Additionally, the WCC circuitry 28, using the MAC 112, may compare the number of welders on the common weld return circuit to a network capacity of a transmission scheme. Further, the monitored weld atmosphere may constantly change. For example, a shipyard could have anywhere from 1 welder to several hundred welders working at any given time. The number of welders working will vary throughout a workday. Accordingly, the ADC 40 may constantly receive information about the weld atmosphere, such as the current network capacity, which affects the transmission scheme selection by the processor 30.

By monitoring the weld atmosphere, the processor 30 determines which of the PHY channels 116, 118, 120, or 122 are suited for data transmission across the weld cable 36 and selects the PHY channel 116, 118, 120, or 122 automatically (e.g., without human intervention) based on this determination (block 130). This selection may be done in real time (e.g., a delay of less than approximately 0.05 seconds) and during a welding operation by the welding system 10. For example, in a situation where machine settings utilize low data transmission rates, the cost for latency to access an open communications link is fairly low. In such a situation, the OFDM PHY 116 may be selected. In general, the OFDM PHY 116 is a single user PHY. Therefore, the OFDM PHY 116 is used, for example, in closed loop process control and in situations where latency is not a concern. On the other hand, when the machine settings utilize the open communications link in an on-demand basis, the DSSS PHY 118 may be selected, as the DSSS PHY 118 offers a solution enabling on-demand access to the open communications link. In this manner, the processor 30 may select which of the PHY channels 116, 118, 120, or 122 are suited for specific instances of data transmission. In another embodiment, a user manually determines which of the PHY channels 116, 118, 120, or 122 is used as the physical layer transmission scheme. For example, in a situation where the user recognizes that the weld atmosphere is not conducive to the OFDM PHY 116 due to a large number of welders on a common weld return circuit, the user may select the DSSS PHY 118 as a default setting prior to the processor 30 conducting any analysis of the weld atmosphere. In this instance, the user may be defined as an IT technician, and the IT technician may set the default PHY setting through a control setting in the welding power supply 12, through an Ethernet cable coupled to the welding power supply 12 and a separate computing device, or through a wireless connection with the welding power supply 12 and a remote computing device.

Subsequently, the transmitters 38 transmit and the receivers 40 receive data transmitted utilizing the selected PHY channel 116, 118, 120, or 122 (block 132). It may also be appreciated, as discussed above, that the transmitters 38 may transmit the data in a mutually orthogonal manner using multiple PHY channels 116, 118, 120, or 122. In this manner, the receivers 40 may receive the data transmitted using the PHY channel 116, 118, 120, or 122 with which the individual receivers 40 are compatible. Further, the data may be transmitted and received by the transmitters 38 and the receivers 40, respectively, while a welding operation occurs.

Figure 10:
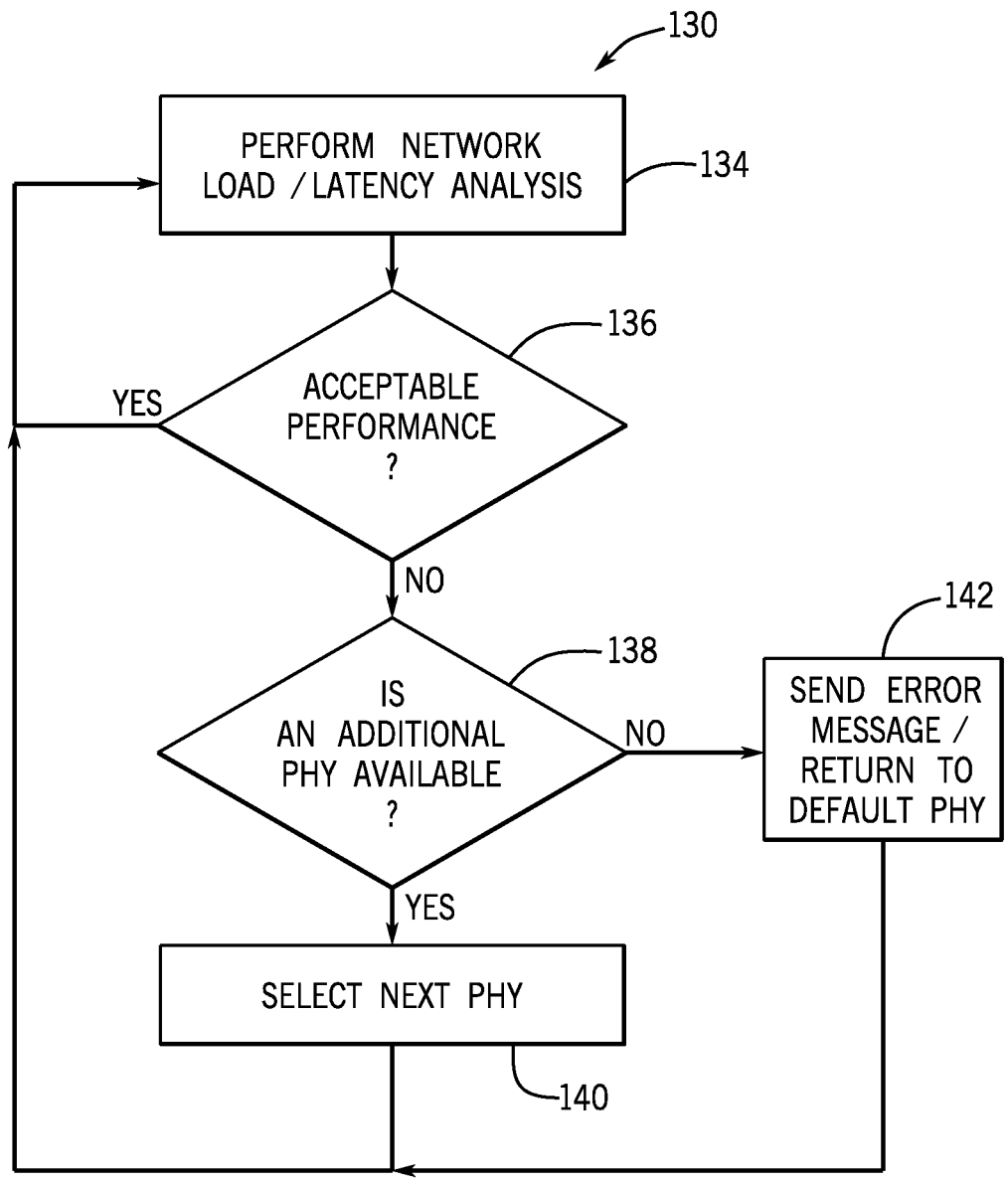
FIG. 10 is a flow diagram of a selection flow for selecting the physical layer communication scheme for the data transmission, in accordance with aspects of the present disclosure.

FIG. 10 is a flow diagram of the block 130 of FIG. 9 for selecting the physical layer transmission scheme for the transmission of the data. Initially, the WCC circuitry 28 may perform a network load analysis and a latency analysis (block 134). During the network load analysis, the WCC circuitry 28 may regularly determine, from the MAC 112 or another device providing an indication of network load, a present demand on the network. Additionally, the WCC circuitry 28 may perform a latency analysis on the network to determine a time for a user to access the network during operation of the network. For example, the latency analysis may indicate how much lag time there is between a welder making a request to access the network and when the welder is actually granted access to the network by the MAC 112. Using the network load and latency analyses, the WCC circuitry 28 may make a determination of whether the performance of the MAC 112 is acceptable (block 136). For example, the WCC circuitry 28 may make a determination as to whether there is too much load demand on the network (e.g., too many welders using a common return circuit), or if the time for accessing the network is too great.

Accordingly, if the WCC circuitry 28 determines that the performance of the MAC 112 is acceptable in its current operation, another network load analysis and latency analysis may be performed at block 134. Contrarily, if the WCC circuitry 28 determines that the performance of the MAC 112 is not acceptable for current welding conditions, a new determination may be made by the WCC circuitry 28 as to whether there is an additional PHY channel 116, 118, 120, or 122 available for the MAC 112 to alter the current physical layer transmission scheme (block 138). For example, the PHY channels 116, 118, 120, and 122 may be arranged in an order from a first PHY channel 116 to a fourth PHY channel 122. Accordingly, if an additional PHY channel is available, the MAC 112 may be instructed by the WCC circuitry 28 to automatically select the next PHY channel 116, 118, 120, or 122 of the order (block 140). Upon selecting the next PHY channel 116, 118, 120, or 122, the WCC circuitry 28 may again perform the network load analysis and the latency analysis at block 134.

In contrast, when the MAC 112 is already using the fourth PHY channel 122, there might not be additional PHY channels available. Accordingly, in this situation, the WCC circuitry 28 may send an error message to a user (e.g., via the display 26 of the welding power supply 12) indicating that none of the PHY channels are providing the MAC 112 with acceptable performance parameters (block 142). Additionally, the MAC 112 may return to a default PHY, in this instance the PHY channel 116, where the network load analysis and the latency analysis may be conducted again at block 134. The flow diagram of the block 130 may continue in this manner until the welding system 10 is turned off, or until the welding system 10 receives an operation error indicating that the welding system 10 should cease operations.

While only certain features of the present embodiments have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A welding system, comprising:
a welding power supply configured to provide a welding power for a welding application through a weld cable, wherein the welding power supply comprises:
  a receiver configured to receive data from the weld cable, to monitor the weld cable for frequency spurs or interfering signals, and to monitor network capacity;
  a processor configured to select a physical layer protocol from a plurality of physical layer protocols based on the frequency spurs or interfering signals and the network capacity;
  a transmitter configured to transmit the data across the weld cable; and
  a media access controller configured to determine a number of welders sharing a common weld return circuit and a cost of latency for accessing an open communications link along the weld cable based on a demand indication from the transmitter, the processor configured to select the physical layer protocol from the plurality of physical layer protocols based on at least one of the number of welders or the cost of latency,
  wherein the processor is further configured to select a physical layer channel of a plurality of physical layer channels that is suited for the selected physical layer protocol, and
  wherein the transmitter is further configured to transmit the data through the selected physical layer channel using the selected physical layer protocol.

2. The welding system of claim 1, wherein the transmitter is configured to transmit one or more modulated and one or more unmodulated tones.

3. The welding system of claim 1, wherein the transmitter is configured to transmit a modulated tone, which is a complex sinusoidal signal utilized to send the data across the weld cable.

4. The welding system of claim 1, wherein the transmitter is configured to transmit an unmodulated tone, which is a sinusoidal signal comprising a reference amplitude, a reference phase, and a reference frequency, and wherein the unmodulated tone is utilized as a reference signal to determine compensation coefficients for a tone carrying the data.

5. The welding system of claim 1, comprising at least two transmitters and two receivers coupled along the weld cable to provide two-way data transmission.

6. The welding system of claim 1, wherein the welding system is configured to provide the welding power and the data from the welding power supply to a wire feeder or a welding torch via the weld cable.

7. The welding system of claim 1, wherein the data is transmitted at a frequency below 30 MHz.

8. A method, comprising:
monitoring a weld cable for frequency spurs or interfering signals and network capacity with a receiver of weld cable communications circuitry;
transmitting a tone through the weld cable from a transmitter disposed along the weld cable with a welding system, wherein the welding system is configured to provide a welding power and data communication for a welding process via the weld cable;
selecting a physical layer transmission scheme of the transmitter based on the frequency spurs or the interfering signals and the network capacity;
determining a number of welders sharing a common weld return circuit and a cost of latency for accessing an open communications link along the weld cable based on a demand indication from the transmitter; and
selecting a physical layer transmission scheme from a plurality of physical layer schemes based on at least one of the number of welders or the cost of latency;
further selecting a physical layer channel of a plurality of physical layer channels that is suited for the selected physical layer scheme; and
transmitting data across the weld cable, wherein the transmitter is configured to transmit the data through the selected physical layer channel using the selected physical layer scheme.

9. The method of claim 8, wherein changing the physical layer transmission scheme comprises a processor selecting at least one of a group of physical layers based on the frequency spurs or the interfering signals and based on the network capacity.

10. The method of claim 8, wherein changing the physical layer transmission scheme comprises a user selecting at least one of the physical layers as a default transmission scheme.

11. The method of claim 8, wherein changing the physical layer transmission scheme of the transmitter occurs automatically in real time during a welding operation.

12. The method of claim 11, wherein transmitting the tone through the weld cable comprises transforming the data into the tone via the physical layer.

13. The method of claim 8, comprising selecting a frequency of the tone to limit the frequency spurs or interfering signals.

14. A welding system, comprising:
a wire feeder configured to receive a welding power for a welding application through a weld cable, wherein the wire feeder comprises:
  a receiver configured to receive data from the weld cable, to monitor the weld cable for frequency spurs or interfering signals, and to monitor network capacity;
  a processor configured to select a physical layer protocol from a plurality of physical layer protocols based on the frequency spurs or interfering signals and the network capacity;
  a media access controller configured to determine a number of welders sharing a common weld return circuit and a cost of latency for accessing an open communications link along the weld cable based on a demand indication from the transmitter, the processor configured to select the physical layer protocol from the plurality of physical layer protocols based on at least one of the number of welders or the cost of latency,
  wherein the processor is further configured to select a physical layer channel of the plurality of the physical layer channels that is suited for the selected physical layer protocol; and
  a transmitter configured to transmit the data across the weld cable, wherein the transmitter is configured to transmit the data through the selected physical layer channel using the selected physical layer protocol.

15. The welding system of claim 14, wherein the selected physical layer protocol comprises an Orthogonal Frequency Division Multiplex (OFDM) physical layer protocol.

16. The welding system of claim 14, wherein the selected physical layer protocol comprises a Direct Sequence Spread Spectrum (DSSS) physical layer protocol.

17. The welding system of claim 14, wherein the selected physical layer protocol comprises a Frequency Hopping Spread Spectrum (FHSS) physical layer protocol.

18. The welding system of claim 14, wherein the selected physical layer protocol comprises a customizable physical layer.

* * * * *